Jan. 27, 1942.　　J. G. HEASLET　　2,271,172
REAR SPROCKET WHEEL FOR CRAWLER TRACTORS
Filed May 6, 1940

INVENTOR
JAMES G. HEASLET
BY George Douglas Jones
ATTORNEY

Patented Jan. 27, 1942

2,271,172

UNITED STATES PATENT OFFICE 2,271,172

REAR SPROCKET WHEEL FOR CRAWLER TRACTORS

James G. Heaslet, Hudson, Ohio, assignor to The Cleveland Tractor Company, Cleveland, Ohio Application May 6, 1940, Serial No. 333,692

2 Claims. (Cl. 74—243)

This invention relates to drive sprockets and, more particularly, to the rear drive sprocket of a tracklaying tractor.

An object of the invention is to provide a drive sprocket fabricated from three main parts, namely a pressed disc section having an offset peripheral flanged edge and a pair of mating toothed rings fastened to either side of the disc.

Another object of the invention is to construct the drive teeth of the sprocket in such a manner that the weight and resultant wear of the tractor shoes passing therearound are borne by the hardened toothed rings.

A still further object of the invention is the formation of the central supporting dished disc member in such a manner that the periphery of the disc lies in a substantially parallel plane about the center of the pivoted side frame of the tractor and thus allows the drive pinions to apply full torque to the sprockets.

Figure 3:
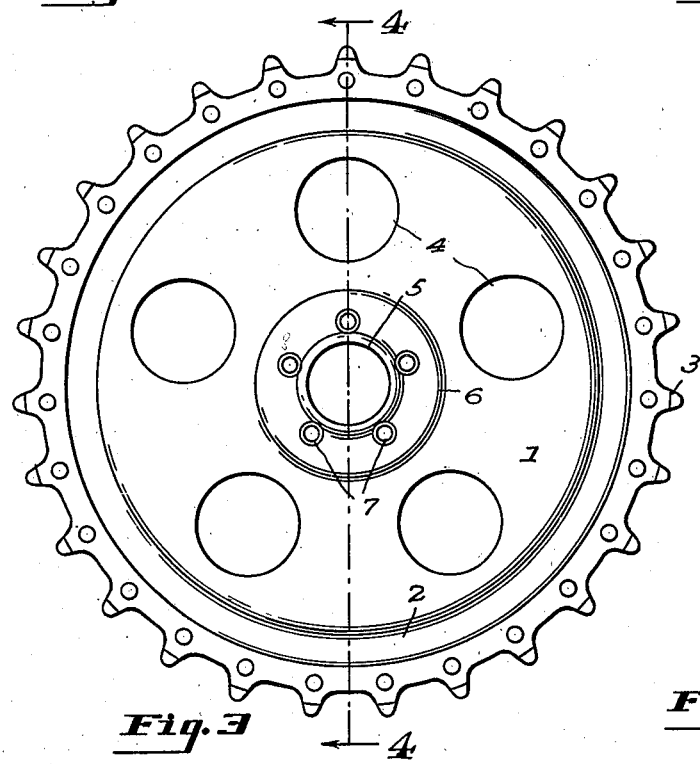
Fig. 3 is a side elevation of the drive sprocket.
Figure 4:
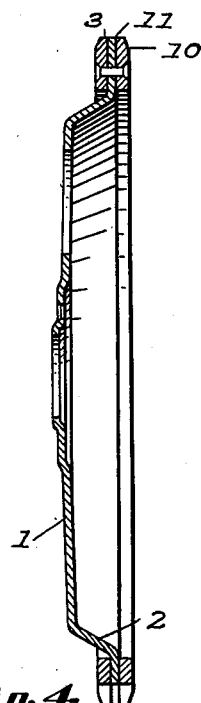
Fig. 4 is a vertical section of the sprocket, taken on line 4—4 of Fig. 3.

Referring to Figs. 3 and 4, the drive sprocket consists essentially of a central disc member 1, having a dished formation formed by the tapered annular shoulder 2 and outwardly extended peripheral flange 3 that lies parallel to the major portion 1 of the disc.

A plurality of openings 4 are preferably formed in the disc for the exit of any dirt or mud which drops down behind the sprocket. The central opening 5 is pressed out from the center of the disc and formed with strengthening corrugated rings 6 and bolt openings 7.

A pair of hardened toothed rings 10 are riveted or otherwise secured to either side of the offset peripheral portion 3 and are complementary to teeth 11 formed in the edge of the disc itself. The outer edges of the toothed rings are tapered or cut away to present a form which permits the teeth to readily enter between the side flanges of the chain shoes.

Numeral 12 denotes broadly a pivoted side frame of a tracklaying tractor positioned on an axle 13 supported within the side walls of a tractor transmission housing 14. Power from the prime mover of the tractor is conveyed through shaft 15 and pinion 16 through pinion 17 to turn the axle 13. While the precise construction of the track shoes 20 is not a part of this invention, they generally consist of forged or cast parallel side rails 21 articulated to adjacent rails by pins 22. Ground engaging plates 23 are attached to and cover the tops of the side rails 21 for supporting and driving the tractor.

In the prior art heavy cast, forged, welded and other types of sprockets have been proposed, but such structures have been found to be costly to manufacture and cumbersome to install and move.

The present sprocket wheel is comparatively light in construction, inasmuch as the disc 1 is dished or pressed out from a sheet of suitable gauge material and the hardened toothed rings 10 riveted to either side of the teeth 11 formed on the periphery of the disc and if one of the hardened wear rings is fractured, it may be easily and cheaply replaced. The sprocket also possesses great strength, as the corrugations formed at both the center of the disc and through the oblique annular shoulder 2 give the sprocket considerable rigidity.

Figure 2:
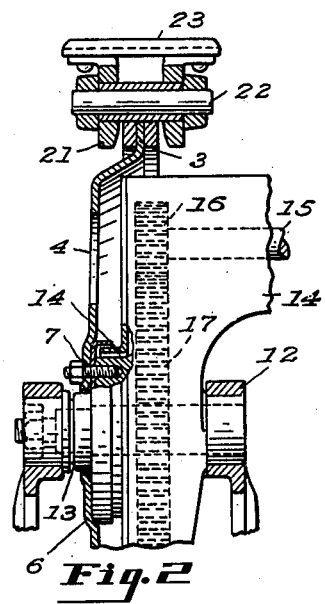
Fig. 2 is a vertical section, taken on line 2—2 of Fig. 1, showing the axle support and power driving means for the sprocket.

Another advantage of the present construction is the manner in which it permits the power to be applied from the axle 13 for driving the wheel in a substantially parallel plane to the plane of the transmission pinions. As shown in Fig. 2, the outer flange 3 of the disc lies in parallel relation to the drive pinions 16 and 17.

Figure 1:
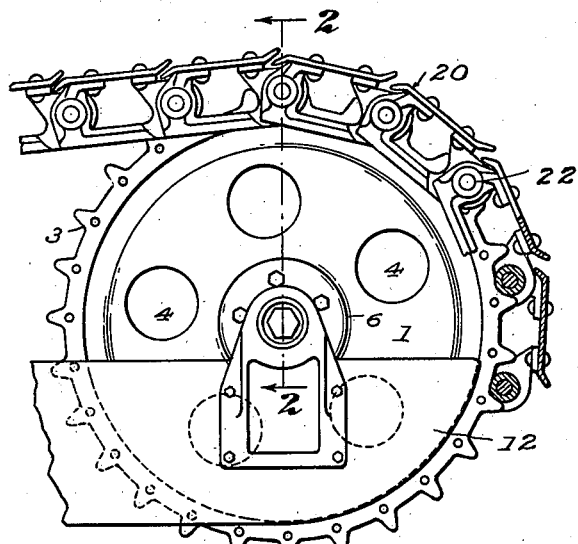
Fig. 1 is a side elevation of the drive sprocket, showing its mounting on a crawler type tractor with one of the track shoes broken away to illustrate its engagement with the sprocket teeth.

Fig. 1 discloses how the pivots 22 joining the several track shoes are supported on the laminated teeth of the drive sprocket. The outer teeth 10 of hardened metal take most of the wear and strain of the load without distortion of the wheel disc by having too great a pressure placed on the slope of the teeth 11 cut in the periphery of the disc per se.

What I claim is:

1. A tractor chain drive sprocket comprising a centrally dished wheel disc having an offset radial flange, chain engaging teeth formed in said flange, and chain engaging toothed rings affixed to the sides of said toothed flange, the radially outer side edges of the toothed rings being inwardly beveled with the outer peripheries of the said disc and rings terminating in the same horizontal plane.

2. A tractor chain drive sprocket comprising a centrally dished wheel disc having an offset radial flange, chain engaging teeth formed in said flange, and chain engaging toothed rings affixed to the sides of said toothed flange, the said toothed rings being formed of metal of greater strength and hardness than the metal of the wheel disc, said disc being coextensive with the said toothed rings.

JAMES G. HEASLET.